(12) United States Patent
Ueno

(10) Patent No.: US 6,418,798 B2
(45) Date of Patent: Jul. 16, 2002

(54) ABNORMAL STATE DETECTING APPARATUS OF TORQUE SENSOR

(75) Inventor: Takayuki Ueno, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/793,284

(22) Filed: Feb. 26, 2001

(51) Int. Cl.⁷ ................................................ G01L 3/02
(52) U.S. Cl. ................................................ 73/862.331
(58) Field of Search ...................... 73/862.331, 862.332, 73/862.333, 862.335

(56) References Cited

U.S. PATENT DOCUMENTS 3,987,362 A * 10/1976 McCann et al. ............ 324/445
4,416,289 A * 11/1983 Bresler .................. 128/207.14
4,752,732 A *  6/1988 Van Schoiack et al. . 324/207.18

* cited by examiner

Primary Examiner—Max Noori
(74) Attorney, Agent, or Firm—Orum & Roth

(57) ABSTRACT

The present invention discloses an abnormal state detecting apparatus in a torque sensor which uses a pair of coils to detect a torque on the basis of a change in inductance.

4 Claims, 5 Drawing Sheets

ABNORMAL STATE DETECTING APPARATUS OF TORQUE SENSOR

BACKGROUND OF THE INVENTION

1. Field of the Invention

The present invention relates to an abnormal state detecting apparatus in a torque sensor which uses a pair of coils to detect a torque on the basis of a change in inductance.

2. Description of the Related Art

In a torque sensor with a pair of coils whose inductance mutually reverses direction in accordance with a torque, a differential amplifier circuit which differentially amplifies a pair of detection voltages induced to the pair of coils when receiving the detection voltages. A torque is then detected from the output of the differential amplifier circuit. In order to diagnose an output of the differential amplifier circuit, the same circuit is connected to the pair of coils in the same manner so as to detect a difference between the outputs of both the differential amplifier circuits.

A pair of rectifier circuits are respectively connected to both of the coils, and respective outputs of the pair of rectifier circuits are respectively input to the differential amplifier circuit via buffer circuits. A circuit constituted by the same pair of rectifier circuits, buffer circuits and differential amplifier circuits is connected to the coil in parallel.

When any of the two pairs of four rectifier circuits are out of order, a difference is generated between the outputs of both of the differential amplifier circuits and an abnormal state can be detected. In the case that only one pair of two rectifier circuits are provided, the outputs of both of the differential amplifier circuits have the same value even when one of the rectifier circuits is out of order. Therefore, no difference is generated therebetween and an abnormal state can not be detected.

Accordingly, there are two pairs of four circuits constituted by the same rectifier circuit. The high number of, circuit constituting members creates a complex circuit.

SUMMARY OF THE INVENTION

The present invention is made by taking the points mentioned above into consideration. An object of the present invention is to provide an abnormal state detecting apparatus of a torque sensor which can simplify a circuit by reducing the number of rectifier circuits.

In order to achieve the object mentioned above, in accordance with the present invention, there is an abnormal state detecting apparatus of a torque sensor. This is comprised of a pair of coils whose inductance mutually reverses in accordance with a torque, and a pair of rectifier circuits respectively connected to the pair of coils. A first differential amplifier means inputs the respective outputs of the pair of rectifier circuits as first and second sub-voltages via buffer circuits, and amplifies a difference between the first and second sub-voltages and outputs the difference as a first main voltage. A second differential amplifier means inputs branch outputs obtained by branching the respective outputs of the pair of rectifier circuits as third and fourth sub-voltages via buffer circuits, and amplifies a difference between the third and fourth sub-voltages and outputs the difference as a second main voltage. There is a control means which detects a torque on the basis of the first main voltage corresponding to the output of the first differential amplifier means and diagnoses the first main voltage by means of the second main voltage. A memory means stores a corresponding relation between any one sub-voltage selected among the first and third sub-voltages previously calculated in a normal state and any one sub-voltage selected among the second and fourth sub-voltages. An abnormal state judging means inputs a pair of sub-voltage values corresponding to the selected pair of sub-voltages and compares the input pair of sub-voltage values with the corresponding relation of the pair of sub-voltages stored by the memory means so as to judge whether or not an abnormal state exists.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

One embodiment of the present invention will be described below with reference to FIG. 1 to FIG. 6.

Figure 1:
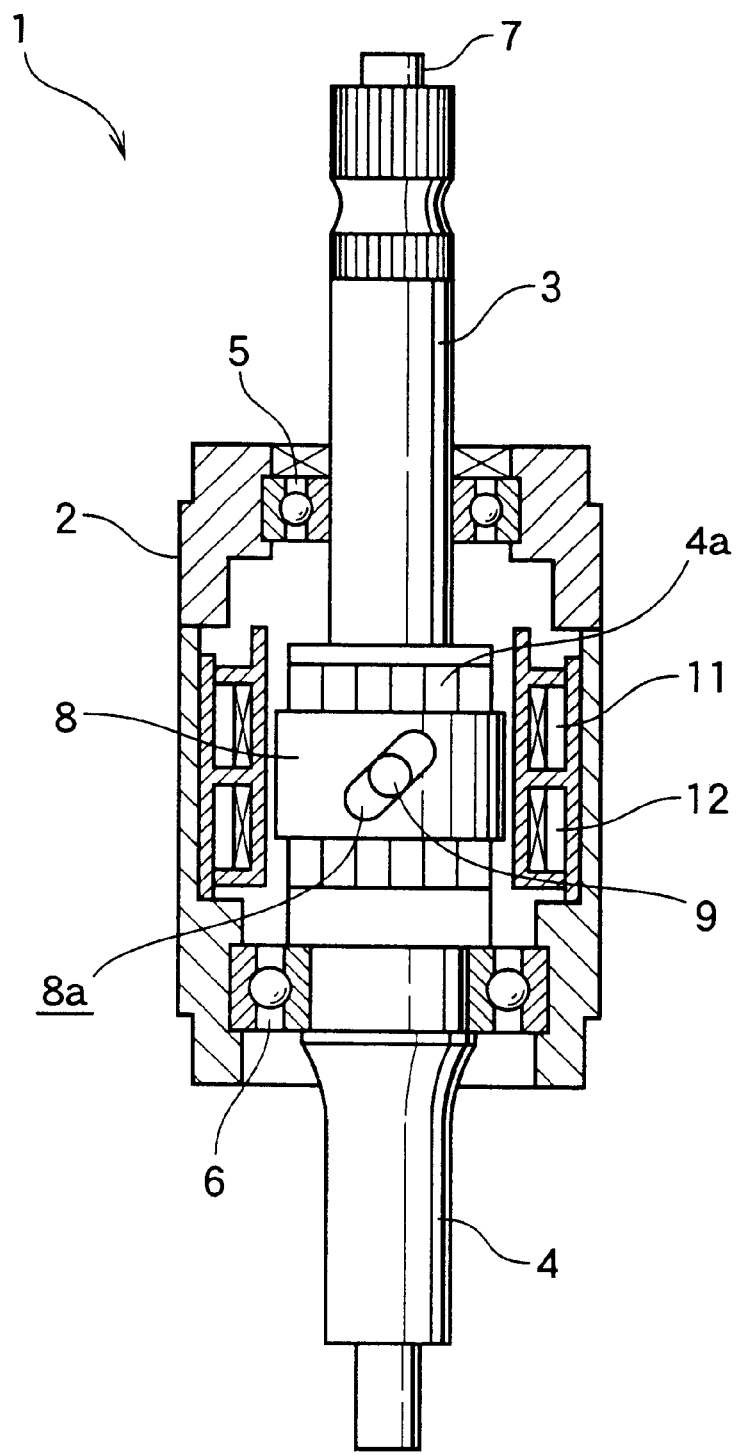
FIG. 1 is a schematic view of a mechanical portion of a torque sensor in accordance with one embodiment of the present invention.

A torque sensor 1 of this embodiment is applied to a power steering system for a vehicle, and FIG. 1 schematically shows a structure of the torque sensor 1.

An input shaft 3 and an output shaft 4 are rotatably supported via bearings 5 and 6, and coaxially inserted into a housing 2, and are connected by a torsion bar 7 therein.

A cylindrical core 8 is fitted onto a serrated outer peripheral surface of a large-diameter end portion 4a of the output shaft 4, and is provided so as to be slidable in only an axial direction with respect to the output shaft 4. A slider pin 9 projected from the input shaft 3 is fitted into a spiral groove 8a of the core 8 in a circumferential direction of the large-diameter end portion 4a through a long slot.

Two torque detecting coils 11 and 12 supported in the housing 2 are provided at an outer periphery of the cylindrical core 8 slidable along an axial direction via a space.

These two coils 11 and 12 are arranged at a side opposite to each other with respect to the center of the axial direction of the slidable core 8.

When a torsional stress acts on the input shaft 3, a rotating force is transmitted to the output shaft 4 via the torsion bar 7, and then, the torsion bar 7 is elastically deformed; as a result, a relative displacement of a rotating direction is generated between the input shaft 3 and the output shaft 4.

The relative displacement of the rotating direction slides the core 8 to the axial direction by an engagement of the slider pin 9 and the spiral groove 8a.

When the core 8 is moved to the axial direction, each area of the coils 11 and 12 surrounding the core 8 varies, and there is a relation such that when an area of one coil surrounding the core 8 increases, an area of the other coil surrounding the core 8 decreases.

When the area surrounding the core 8 increases, a magnetic loss increases; therefore, an inductance of the coil decreases. Conversely, when the area surrounding the core 8 decreases, a magnetic loss decreases; therefore, an inductance of the coil increases.

Accordingly, in the case where a torque of moving the core 8 to the coil 11 side acts, an inductance L1 of the coil 11 decreases, and an inductance L2 of the coil 12 increases. Conversely, in the case where a torque of moving the core 8 to the coil 12 side acts, an inductance L1 of the coil 11 increases, and an inductance L2 of the coil 12 decreases.

Figure 2:
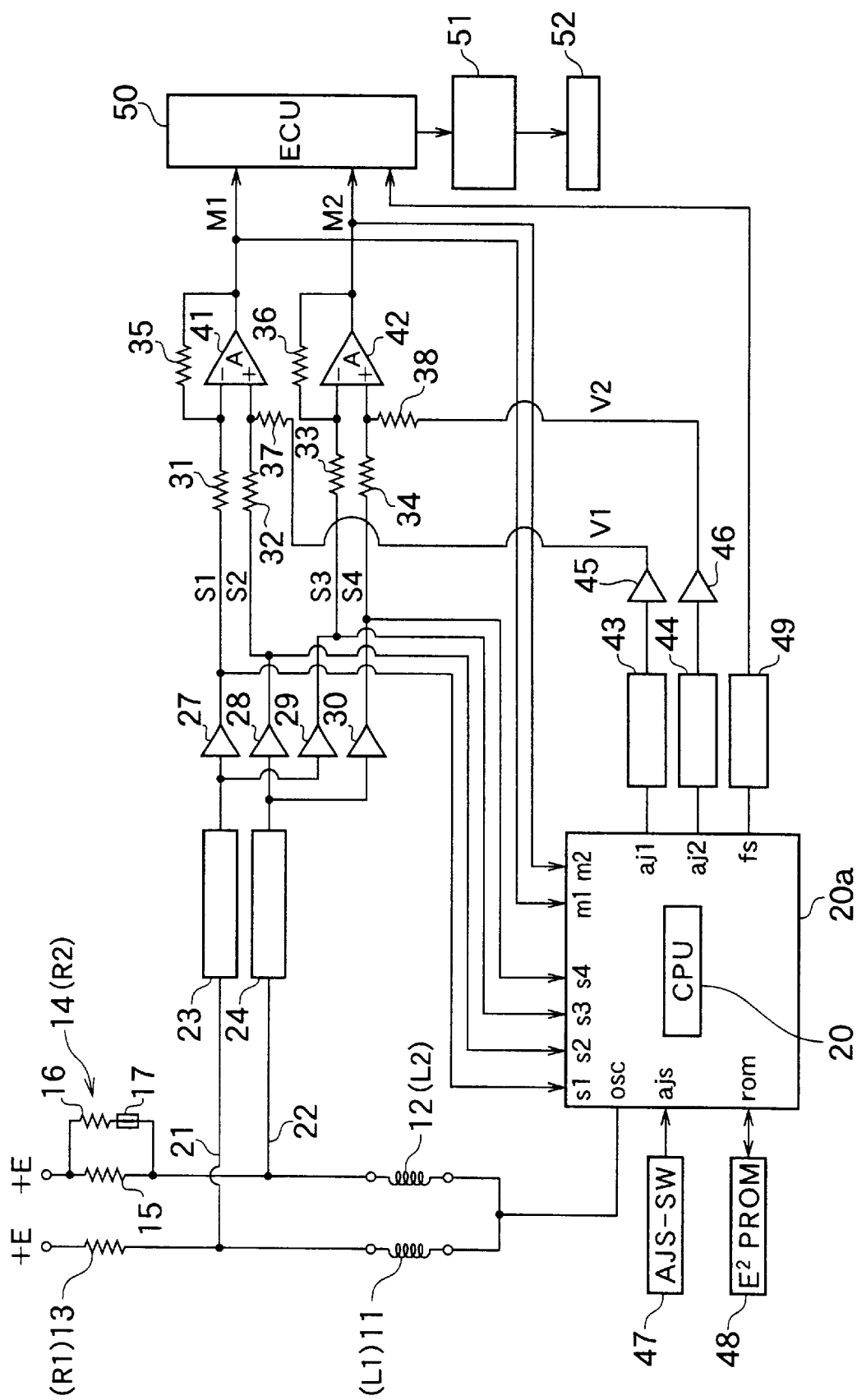
FIG. 2 is a schematic diagram of an electric circuit portion of the torque sensor.

FIG. 2 is a block diagram schematically showing a construction of electric circuit parts of the torque sensor 1 which detects a torque on the basis of a change of the inductances L1 and L2 of the coils 11 and 12.

The coils 11 and 12 are suspended from a positive voltage E via a resistor 13 (R1) and a resistor circuit 14 (R2), respectively. The other terminal of respective coils 11 and 12 is connected to an oscillating output terminal osc of a control board 20a which is mounted with a CPU 20.

The resistor circuit 14 has a construction in which a resistor 15 is connected in parallel to a resistor 16 and a thermister 17 connected in series, and performs as a temperature compensating function by an effect of the thermister 17.

More specifically, the thermister 17 has a temperature characteristic of showing a resistance value R2 always satisfying a relation R1/L1=R2/L2 regardless of a temperature change.

A voltage signal line 21 extends from a connective portion of the coil 11 and the resistor 13 is connected to a rectifier/smoothing circuit 23. On the other hand, a voltage signal line 22 extends from a connective portion of the coil 12 and the resistor circuit 14 is connected to a rectifier/smoothing circuit 24.

In other words, these coils 11 and 12, the resistor 13 and the resistor circuit 14 constitute a bridge circuit, and when an oscillation voltage is inputted to the bridge circuit, an output voltage of the bridge circuit is inputted to the rectifier/smoothing circuits 23 and 24.

An output line of one rectifier/smoothing circuit 23 is branched and the branched output lines are respectively connected to buffer circuits 27 and 29. An output line of another rectifier/smoothing circuit 24 is branched and the branched output lines are respectively connected to buffer circuits 28 and 30. Output voltages of the buffer circuits 27, 28, 29 and 30 are respectively set to first, second, third and fourth sub-voltages S1, S2, S3 and S4.

Output terminals of the buffer circuits 27 and 28 are respectively connected to an inverting input terminal and a non-inverting input terminal of a differential amplifier 41 via resistors 31 and 32, whereby the first and second sub-voltages S1 and S2 are input.

In the same manner, output terminals of the buffer circuits 29 and 30 are respectively connected to an inverting input terminal and a non-inverting input terminal of a differential amplifier 42 via resistors 33 and 34, whereby the third and fourth sub-voltages S3 and S4 are input.

A negative feedback is applied to the differential amplifiers 41 and 42 by resistors 35 and 36 so as to function as a differential amplifier, and then, outputs of these differential amplifiers 41 and 42 are inputted to an electronic control unit ECU 50 as a first main voltage M1 and a second main voltage M2.

Neutral point adjusting voltages V1 and V2 are individually inputted to each non-inverting input terminal of the differential amplifiers 41 and 42 from neutral point voltage setting circuits 43 and 44 via buffer circuits 45 and 46 and resistors 37 and 38.

The neutral point voltage setting circuits 43 and 44 input each adjusting signal from neutral point adjusting output terminals aj1 and aj2 of the control board 20a, and then set neutral point voltages V1 and V2 according to the adjusting signal.

The differential amplifier 41 multiplies a difference between the first sub-voltage S1 and the second sub-voltage S2 by A, and then, outputs a voltage to which adding the neutral point adjusting voltage V1 as a bias voltage, as a first main voltage M1.

Namely, the first main voltage M1 is obtained from the following equation.

$$M1=(S2-S1)\cdot A+V1$$

Likewise, a second main voltage M2 outputted by the differential amplifier 42 is obtained from the following equation.

$$M2=(S4-S3)\cdot A'+V2$$

In this case, the relation V1≈V2 and A≈A' is established.

The main voltage at a neutral time, biased to neither a right steering torque (torsional torque of right direction) nor a left steering torque (torsional torque of left direction) is called as a neutral point voltage. The neutral point adjusting voltages V1 and V2 mentioned above are equivalent to the neutral point voltage.

The ECU 50 outputs a motor control signal to a motor driver 51 on the basis of the first main voltage M1, and then, a motor 52 assisting steering is driven by the motor driver 51.

On the other hand, the second main voltage M2 is used for detecting an abnormal state, and the ECU 50 makes a decision whether or not a difference between the first main voltage M1 and the second main voltage M2 is within a predetermined allowable range. In the case where the difference exceeds the allowable range, the ECU 50 makes a decision that the torque sensor 1 is in an abnormal state, and then, outputs an abnormal state signal so as to control or stop the motor 52.

Further, the first, second, third and fourth sub-voltages S1, S2, S3 and S4 and the first and second main voltages M1 and M2 are input to the control board 20a. The control board 20a judges an abnormal state of the torque sensor 1, the connecting system, the amplifier circuit and the like on the basis of the third and fourth sub-voltages S3 and S4. When detecting the abnormal state, the control board 20a outputs an abnormal state detection signal to an abnormal swiching circuit 49 from an abnormal state output terminal fs.

The abnormal swiching circuit 49 is directly connected to an ECU 50, and outputs an on signal to the ECU 50 when inputting the abnormal state detection signal from the abnormal state output terminal fs.

Moreover, in the control board 20a, a neutral point adjusting signal AJS for adjusting a neutral point is inputted to a neutral point adjusting terminal ajs from a neutral point adjusting switch AJS-SW 47. An $E^2PROM$ 48, which is capable of storing and rewriting the neutral point voltage setting state, is connected to a neutral point voltage setting terminal rom.

Figure 3:
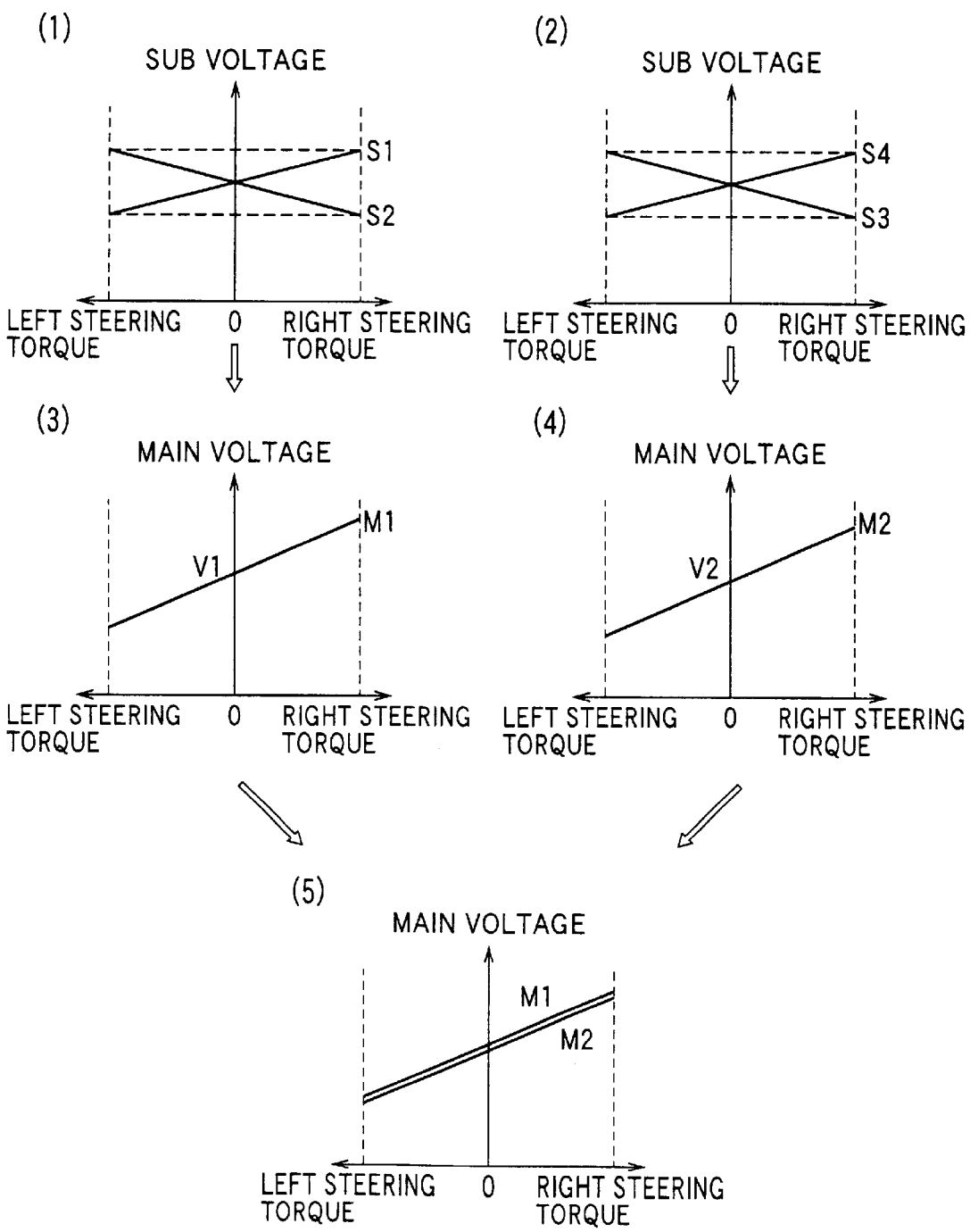
FIG. 3 is a schematic view showing states of first, second, third and fourth sub-voltages and first and second main voltages in a normal state.

The torque sensor of this embodiment has a circuit construction as described above, and an operation of the torque sensor will be described below with reference to FIG. 3 showing each state of first, second, third and fourth sub-voltages S1, S2, S3 and S4 and first and second main voltages M1 and M2.

Each coordinate shown in FIG. 3 has a vertical axis showing a voltage, the right direction of a horizontal axis showing a right steering torque, and the left direction of a horizontal axis showing a left steering torque. The origin 0 is the neutral point.

FIG. 3 shows a state and condition in which the torque sensor 1 is normally operated. When a right steering torque increases, the core 8 is moved to the coil 11 side by a relative rotation of the input shaft 3 and the output shaft 4, and the inductance L2 of the coil 12 is increased so that an induced electromotive force of the coil 12 is increased; conversely, the inductance L1 of the coil 11 is decreased so that an induced electromotive force of the coil 11 is reduced. Therefore, the second and fourth sub-voltages S2 and S4 increase; on the other hand, the first and third sub-voltages S1 and S3 decrease (see FIG. 3(1) and FIG. 3(2)).

Moreover, when left steering torque increases, conversely to the above case, the second and fourth sub-voltages S2 and S4 decrease; on the other hand, the first and third sub-voltages S1 and S3 increase (see FIG. 3(1) and FIG. 3(2)).

In this case, St denotes a neutral point voltage of the third and fourth sub-voltages S3 and S4.

Thus, a difference between the above two sub-voltages is multiplied by A(A'), and then, the neutral point voltage is added to the first and second main voltages M1 and M2 which are the outputs of the differential amplifiers 41 and 42. Accordingly, the first and second main voltages M1 and M2 become inclined lines upward to the right passing through V1 and V2 at the neutral point, as shown in FIG. 3(3) and FIG. 3(4), respectively.

Then, the ECU 50 compares the first and second main voltages M1 and M2, and makes a decision whether or not the difference between these main voltages is within the allowable range.

When the difference is normal, as shown in FIG. 3(5), the change of the first and second main voltages M1 and M2 is approximately coincident; therefore, a decision is made that the difference is within the allowable range.

When a decision is made that the torque sensor is normal, the ECU outputs an instructive signal for driving the motor 52 to the motor driver 51 on the basis of the first main voltage M1.

In the aforesaid manner, an auxiliary power by the motor acts onto steering in accordance with a steering torque, and thus, power steering is performed.

However, in the case that one of the rectifier circuits 23 and 24 gets out of order, the first and second main voltage M1 and M2 indicate the same value and no difference is generated, so that it is impossible to detect an abnormal state.

Accordingly, the control board 20a is independently provided with the means for detecting an abnormal state of the torque sensor 1, the connecting system, the amplifier circuit and the like on the basis of the third and fourth sub-voltages S3 and S4 as mentioned above.

Figure 4:
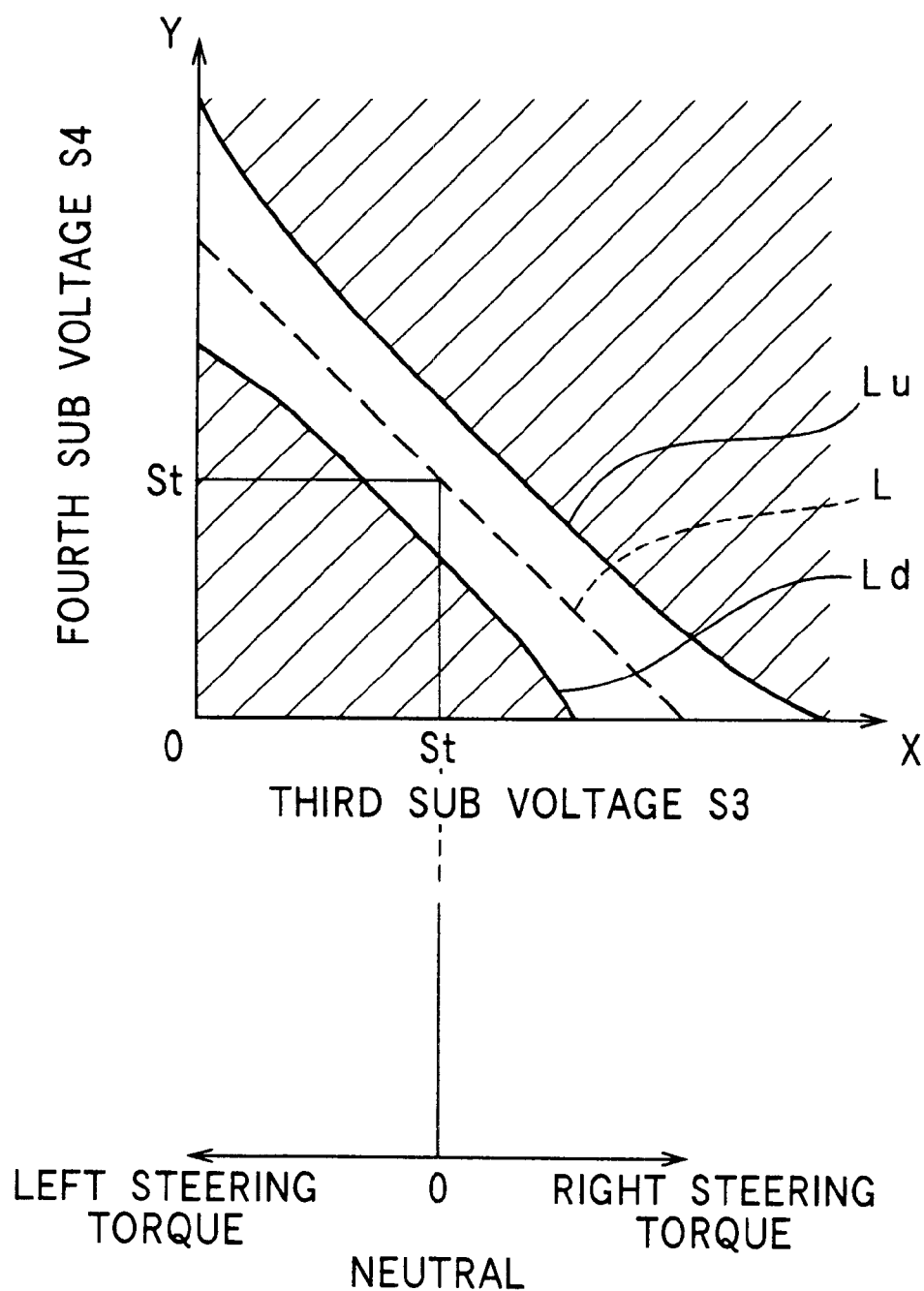
FIG. 4 is a schematic view showing a coordinates map with respect to the third and fourth sub-voltages.

A coordinates map in X-Y coordinates shown in FIG. 4 is stored in the memory of the control board 20a.

The coordinates map is obtained by previously calculating an ideal relation characteristic curve L of the third and fourth sub-voltages S3 and S4 in the normal state and setting an upper limit curve Lu and a lower limit curve Ld on the X-Y coordinates in which the X axis and the Y axis are respectively defined by the third sub-voltage S3 and the fourth sub-voltage S4, in such a manner as to be substantially symmetrical with respect to the ideal relation characteristic curve L.

The third and fourth sub-voltages S3 and S4 are equivalent to the voltages branched in the downstream side of the rectifier circuits 23 and 24. The ideal relation characteristic curve L is accordingly a curve substantially close to a straight line including the characteristics of the rectifier circuits 23 and 24. The upper limit curve Lu and the lower limit curve Ld are obtained by taking the characteristics of the rectifier circuits 23 and 24 into consideration.

Since the third and fourth sub-voltages S3 and S4 move in a symmetrical manner, the ideal relation characteristic curve L in FIG. 4 is a substantially straight line having a right descending incline. A width between the upper limit curve Lu and the lower limit curve Ld, which are set above and below the ideal relation characteristic curve L, is set to be narrow to a level that an erroneous detection is not generated.

Figure 5:
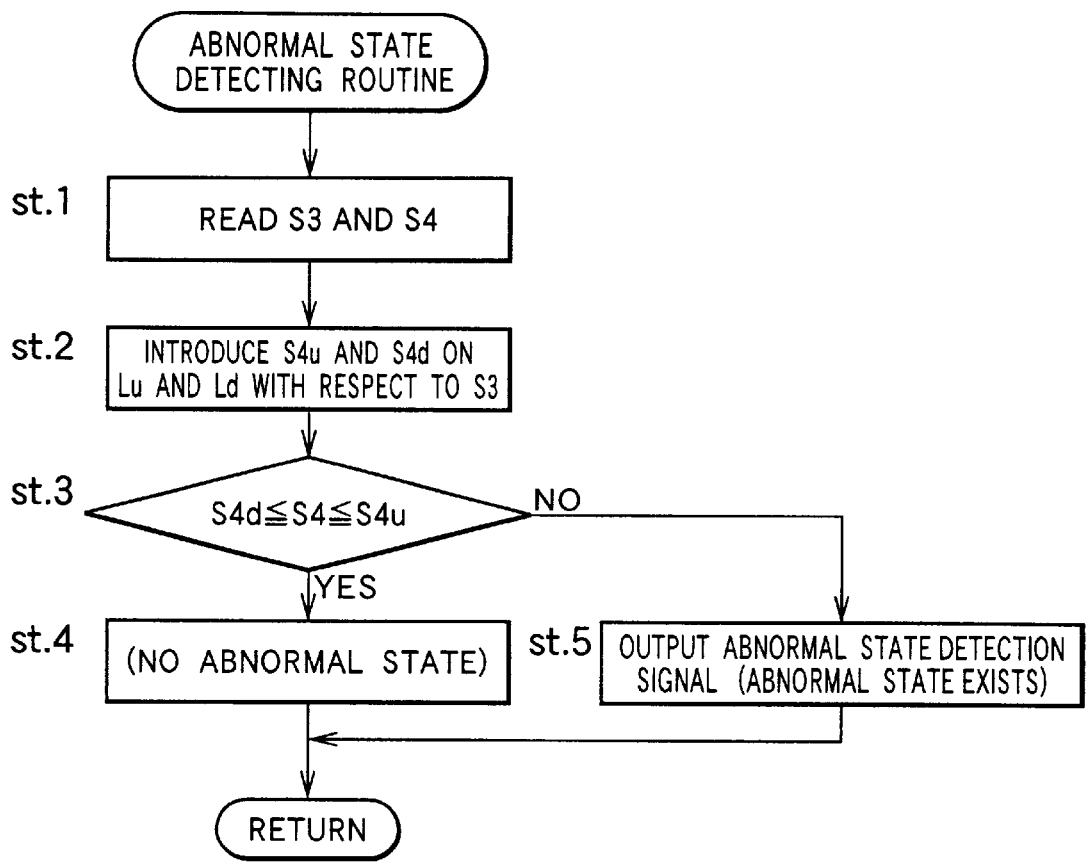
FIG. 5 is a flow chart showing a control procedure for detecting an abnormal state by means of a control board.

The CPU 20 of the control board 20a has a control program for detecting an abnormal state by using the coordinates map. A flow chart showing a control procedure of the control program is illustrated in FIG. 5.

Figure 6:
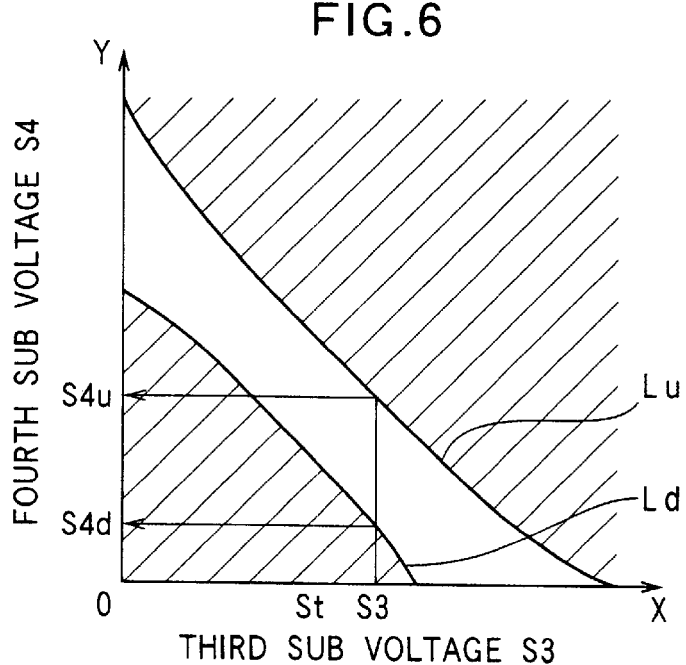
FIG. 6 is a schematic view showing a way for using the coordinates map.

At first, the third and fourth sub-voltage values S3 and S4 are read in step 1, and the upper limit fourth sub-voltage value S4$u$ and the lower limit fourth sub-voltage value S4$d$ shown by the upper limit curve Lu and the lower limit curve Ld corresponding to the third sub-voltage value S3 are read in accordance with the coordinates map introduced in the next step 2 (refer to FIG. 6).

Then, in step 3, it is judged whether or not the fourth sub-voltage value S4 read in step 1 exists between the upper limit fourth sub-voltage value S4$u$ and the lower limit fourth sub-voltage value S4$d$. In this case, if the fourth sub-voltage value S4 exists therebetween, the step goes to step 4, it is judged that there is no abnormal state, and the abnormal state detection signal is not output. However, if the fourth sub-voltage value S4 does not exist between the upper limit fourth sub-voltage value S4$u$ and the lower limit fourth sub-voltage value S4$d$, the step goes to step 5, where it is judged that the abnormal state exists, and the abnormal state detecting signal is output to the abnormal switching circuit 49.

When the abnormal state detection signal is output to the abnormal switching circuit 49, the on signal is output to the ECU 50 from the abnormal switching circuit 49, and the ECU 50 stops controlling the motor 52.

As mentioned above, the abnormal state is detected by previously calculating the ideal relation characteristic curve L of the third and fourth sub-voltages S3 and S4 in the normal state, storing the coordinates map in which the upper limit curve Lu and the lower limit curve Ld are set on the basis of the ideal relation characteristic curve L and judging whether or not the points on the coordinates map shown by the actually detected third and fourth sub-voltage values S3 and S4 exist between the upper limit curve Lu and the lower limit curve Ld.

Even in the case that one of two rectifier circuits 23 and 24 gets out of order, the points indicated by the third and fourth sub-voltage values S3 and S4 are apart from the area between the upper limit curve Lu and the lower limit curve Ld and it is possible to easily detect the abnormal state.

It is possible to minimize the number of the rectifier/smoothing circuits to securely detect the abnormal state.

Further, it is possible to reduce the trouble rate of the rectifier/smoothing circuit.

It is possible to further improve the accuracy of abnormal detection by setting the width between the upper limit curve Lu and the lower limit curve Ld to be narrow to a level that an erroneous detection is not generated.

As mentioned above, since it is possible to judge the abnormal state including the abnormal state of the rectifier circuit by the pair of two rectifier circuits 23 and 24, a pair of rectifier circuits is sufficient, it is possible to reduce two rectifier circuits, and it is possible to simplify the circuit.

In the embodiment mentioned above, the structure is made such that the control board 20a detects the abnormal state on the basis of the third and fourth sub-voltages S3 and S4. In the same manner, the structure may be made such that the abnormal state is detected on the basis of the first and second sub-voltages S1 and S2, on the basis of the first and fourth sub-voltages S1 and S4, or on the basis of the sub-voltages S2 and S3.

As heretofore explained, embodiments of the present invention have been described in detail with reference to the drawings. However, the specific configurations of the present invention are not limited to the embodiments but those having a modification of the design within the range of the present invention are also included in the present invention.

As mentioned above, the invention described in the first aspect of the present application provides an abnormal state detecting apparatus of a torque sensor which has a pair of coils whose inductance reverses direction in accordance with a torque. A pair of rectifier circuits are respectively connected to the pair of coils. First differential amplifier means inputs the respective outputs of the pair of rectifier circuits as first and second sub-voltages via buffer circuits, amplifying a difference between the first and second sub-voltages and outputting the difference as a first main voltage. Second differential amplifier means inputs branch outputs obtained by branching the respective outputs of the pair of rectifier circuits as third and fourth sub-voltages via buffer circuits, amplifying a difference between the third and fourth sub-voltages and outputting the difference as a second main voltage. Control means detects a torque on the basis of the first main voltage corresponding to the output of the first differential amplifier means and diagnosing the first main voltage by means of the second main voltage. Memory means stores a corresponding relation between any one sub-voltage selected among the first and third sub-voltages previously calculated in a normal state and any one sub-voltage selected among the second and fourth sub-voltages. Abnormal state judging means inputs a pair of sub-voltage values corresponding to the selected pair of sub-voltages and compares the input pair of sub-voltage values with the corresponding relation of the pair of sub-voltages stored by the memory means so as to judge whether or not an abnormal state exists.

The selected pair of sub-voltages are respectively equivalent to the voltages in the downstream side of the rectifier circuit, and the characteristic of the rectifier circuit is included in the corresponding relation of the pair of sub-voltages previously calculated in the normal state.

Accordingly, when the abnormal state judging means judges the abnormal state by comparing the pair of sub-voltage values input with the corresponding relation of the pair of sub-voltages, it is possible to judge the abnormal state including the abnormal state of the rectifier circuit. A pair of rectifier circuits is sufficient, and it is possible to reduce two rectifier circuits.

Therefore, it is possible to reduce the trouble rate of the rectifier circuit.

Further, the invention described in the second aspect provides an abnormal state detecting apparatus of a torque sensor as recited in the first aspect, in which the memory means stores a coordinates map obtained by setting an upper limit curve and a lower limit curve on the basis of an ideal relation characteristic curve between the selected pair of sub-voltages previously calculated in a normal state. On an X-Y coordinate one of the selected pair of sub-voltages is defined by an X axis and another sub-voltage is defined by a Y axis. The abnormal state judging means inputs a pair of sub-voltage values with respect to the selected pair of sub-voltages and judges that the abnormal state exists when the point coordinates indicated by the pair of sub-voltage values in the coordinates map stored by the memory means do not exist between the upper limit curve and the lower limit curve.

The abnormal state is judged by the position of the point coordinates indicated by the pair of sub-voltage values in the coordinates map in which the upper limit curve and the lower limit curve are set on the basis of the ideal relation characteristic curve of the selected pair of sub-voltages in the normal state. Therefore, it is possible to detect the abnormal state including the trouble of the rectifier circuit even in the case of a pair of rectifier circuits.

Since the width between the upper limit curve and the lower limit curve is set to be narrow to a level that the erroneous detection is not generated, it is possible to improve an accuracy of abnormal state detection.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. An abnormal state detecting apparatus of a torque sensor comprising:

a pair of coils whose inductance mutually reverses direction in accordance with a torque;

a pair of rectifier circuits respectively connected to said pair of coils;

first differential amplifier means inputting the respective outputs of said pair of rectifier circuits as first and second sub-voltages via buffer circuits, amplifying a difference between the first and second sub-voltages and outputting the difference as a first main voltage;

second differential amplifier means inputting branch outputs obtained by branching the respective outputs of said pair of rectifier circuits as third and fourth sub-voltages via buffer circuits, amplifying a difference between the third and fourth sub-voltages and outputting the difference as a second main voltage;

control means detecting a torque on the basis of the first main voltage corresponding to the output of said first differential amplifier means and diagnosing the first main voltage by means of the second main voltage;

memory means storing a corresponding relation between any one sub-voltage selected among said first and third sub-voltages previously calculated in a normal state and any one sub-voltage selected among said second and fourth sub-voltages; and abnormal state judging means inputting a pair of sub-voltage values with respect to said selected pair of sub-voltages and comparing said input pair of sub-voltage values with the corresponding relation of the pair of sub-voltages stored by said memory means so as to judge whether or not an abnormal state exists.

2. An abnormal state detecting apparatus of a torque sensor as claimed in claim 1, wherein said memory means is arranged and constructed to input a coordinates map obtained by setting an upper limit curve and a lower limit curve on the basis of an ideal relation characteristic curve between said selected pair of sub-voltages previously calculated in a normal state, on an X-Y coordinates in which one of said selected pair of sub-voltages is defined by an X axis and another sub-voltage is defined by a Y axis, and wherein said abnormal state judging means is arranged and constructed to input a pair of sub-voltage values with respect to said selected pair of sub-voltages and is arranged and constructed to judge that the abnormal state exists when the point coordinates indicated by said pair of sub-voltage values in the coordinates map stored by said memory means do not exist between said upper limit curve and said lower limit curve.

3. An abnormal state detecting apparatus of a torque sensor as claimed in claim 1, wherein said control means is arranged and constructed to judge whether or not a difference between the first main voltage and the second main voltage is within a predetermined allowable range, and is arranged and constructed to output an abnormal state signal when the difference is over the allowable range.

4. An abnormal state detecting apparatus of a torque sensor as claimed in claim 2, wherein the accuracy of abnormal state detection performed by the abnormal state judging means is arranged and constructed to be adjusted by setting and changing said upper limit curve and the lower limit curve.

* * * * *